United States Patent
Krishnamurthy

(10) Patent No.: US 11,138,540 B2
(45) Date of Patent: Oct. 5, 2021

(54) CREATING DIGITAL WORKERS IN ORGANIZATIONS

(71) Applicant: Hewlett-Packard Development Company, L.P., Houston, TX (US)

(72) Inventor: Jayaraman Krishnamurthy, Chennai (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 317 days.

(21) Appl. No.: 16/097,521

(22) PCT Filed: Jun. 15, 2017

(86) PCT No.: PCT/US2017/037746
§ 371 (c)(1),
(2) Date: Oct. 29, 2018

(87) PCT Pub. No.: WO2018/017214
PCT Pub. Date: Jan. 25, 2018

(65) Prior Publication Data
US 2019/0147382 A1    May 16, 2019

(30) Foreign Application Priority Data

Jul. 20, 2016    (IN) .............................. 201641024937

(51) Int. Cl.
*G06Q 10/06* (2012.01)
*G06Q 10/10* (2012.01)
(Continued)

(52) U.S. Cl.
CPC ..... *G06Q 10/06316* (2013.01); *G06F 9/4843* (2013.01); *G06Q 10/10* (2013.01);
(Continued)

(58) Field of Classification Search
None
See application file for complete search history.

(56) References Cited

U.S. PATENT DOCUMENTS

| 5,737,498 A | 4/1998 | Murray |
| 6,292,715 B1 | 9/2001 | Rongo |
| (Continued) | | |

FOREIGN PATENT DOCUMENTS

EP    2933066    10/2015

OTHER PUBLICATIONS

Deloitte~Automate this The business leader s guide to robotic and intelligent automation Service Delivery Transformation, 2016, http://docplayer.net/ ~25 pages.

(Continued)

*Primary Examiner* — Stephanie Z Delich
(74) *Attorney, Agent, or Firm* — HP Inc. Patent Department

(57) ABSTRACT

In one example, a request may be received to create a digital worker to perform at least one automated task. The digital worker may be created in an organization upon receiving the request. Example digital worker may be a computer program to perform the at least one automated task. Credentials may be generated for the created digital worker. The credentials associated with the created digital worker may be updated in the organizations employee directory. The digital worker may be enabled to perform the at least one automated task upon updating the credentials in the organizations employee directory.

20 Claims, 4 Drawing Sheets

(51) Int. Cl.
*G06F 9/48* (2006.01)
*H04L 29/06* (2006.01)

(52) U.S. Cl.
CPC ....... *G06Q 10/105* (2013.01); *H04L 63/0876* (2013.01); *H04L 63/102* (2013.01)

(56) References Cited

U.S. PATENT DOCUMENTS

| | | | | |
|---|---|---|---|---|
| 7,039,654 | B1* | 5/2006 | Eder | G06Q 10/06 |
| 9,110,732 | B1* | 8/2015 | Forschmiedt | G06F 8/61 |
| 2003/0115243 | A1* | 6/2003 | Smith | G06F 9/5044 |
| | | | | 718/104 |
| 2011/0196798 | A1 | 8/2011 | Bugayenko | |
| 2015/0012919 | A1* | 1/2015 | Moss | G06F 9/455 |
| | | | | 718/1 |
| 2015/0367513 | A1* | 12/2015 | Gettings | B25J 9/0084 |
| | | | | 700/248 |
| 2016/0346928 | A1* | 12/2016 | Zhang | B25J 9/1679 |
| 2017/0001308 | A1* | 1/2017 | Bataller | G06F 3/0484 |
| 2017/0228119 | A1* | 8/2017 | Hosbettu | G06Q 10/00 |

OTHER PUBLICATIONS

Digital Employee, < http://digitalworkforce.fi/en/digital-employee/ > 2016~7 pages.

Horton, R., et al., Deloitte the Robots are Coming, Feb. 15, 2015, <http://www2.deloitte.com/~12 pages.

Infoworld—Robotic Process Automation: The New IT Job Killer, Mar. 23, 2015, http://www.infoworld.com/article/~5 pages.

ABB Flexible Automation AB Product manual IRB 6400R M99, Online manual internet citation Sep. 13, 2006—481 pages~~First 14 pages.

Abb Robotics "Operating manual RobotStudio" Feb. 23, 2012 520 pages First 15 pages.

Anonymous • "3shape Dental System 2016 User Manual" Jan. 1, 2016 pp. 1-1092, XP055583909~~First 19 pages.

Siemens Sinumerik 840/810D Operators Guide HT6 Operators guide Jun. 1, 2002, 181 pages~~First 18 pages.

Siemens Ag "Sinumerik—Siemens AG" Sinumerick, User's Manual—2012-2013~278 pages~~first 8 pages.

* cited by examiner

CREATING DIGITAL WORKERS IN ORGANIZATIONS

BACKGROUND

In organizations, robotic process automation (RPA) may be used to automate repetitive transaction processing and high intensive manual work to reduce transaction turn-around time and full time equivalents (FTEs). For example, RPA may enable to have robots to carry out daily work related to business processes, information technology (IT) support processes, workflow processes, remote infrastructure, back-office work and the like.

BRIEF DESCRIPTION OF THE DRAWINGS

Examples are described in the following detailed description and in reference to the drawings, in which.

DETAILED DESCRIPTION

Figure 1:
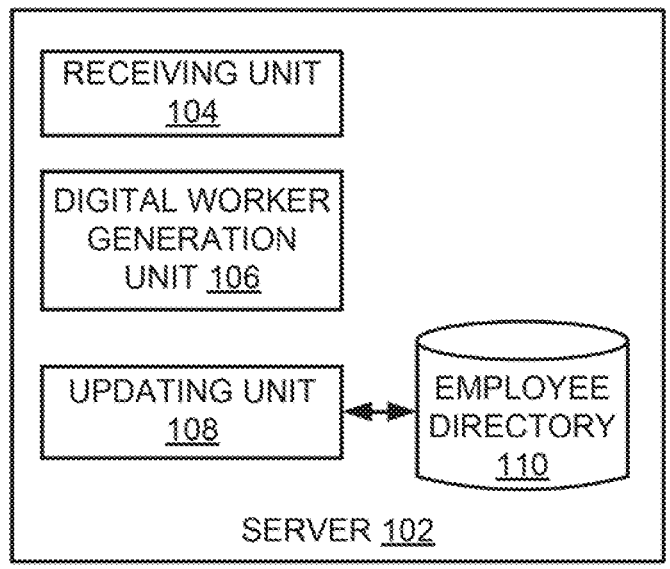
FIG. 1 is a block diagram of an example server for creating a digital worker in an organization.

Robotic process automation (RPA) may enable to have robots to carry out daily tasks related to business processes, information technology (IT) support processes, workflow processes, remote infrastructure, back-office work and the like. Tasks that are run in background or executed without human intervention may be considered as robots. Example tasks may include repetitive transactions performed by business on client-based and web-based applications, repetitive manual tasks performed by users in IT systems, and the like. In RPA, each robot may be associated with a robotic identifier (ID) to execute the transactions (e.g., access the applications, systems and network) without human intervention. However, the robotic ID may not make the robot truly digital as the robotic ID may be associated with an ID of a human employee to carry out the tasks. Further, the robotic IDs may have multiple application access and run on multiple systems and servers to perform multiple processes, thereby making a challenge to equate with employee workforce. As a result, plain robotic ID may not be collated to determine how many robots are working for an organization, how many robots are performing what level of productivity, and the comparison of human employee and robots.

Examples described herein may create a digital worker in an organization to perform activities of robots (i.e., tasks that are automated through RPA) upon receiving a request. The digital worker may be created through a human resource (HR) management process associated with the organization. The digital worker may be a computer program to perform/run at least one automated task (e.g., RPA task). Further, examples described herein may generate credentials (e.g., an employee ID, an email ID, and/or a network (NT) ID) for the created digital worker and update the credentials associated with the created digital worker in the organization's employee directory. The digital worker may perform/execute/run at least one automated task based on pre-defined rule-based processes that are automated through RPA upon updating the credentials in the organization's employee directory. The digital worker may perform/execute at least one automated task through robots. In one example, the digital worker may perform the automated tasks, that a user/employee might be performing through robots, using the credentials to access relevant applications to perform the RPA's automated tasks. Thus, the digital worker can be part of the organization's employee directory and may perform daily tasks of RPA process through robots. The employee ID generated for the digital worker may be independent of an employee ID of a regular or contingent employee, i.e., the digital worker may not need the employee ID of a human worker to execute the automated tasks.

Examples described herein may create the digital worker as a part of a digital workforce to perform/execute the RPA task through a robot. The digital workforce as a part of employee directory may enable to run RPA tasks without manual or user intervention, thereby making the robotic process touchless. Examples described herein may create the digital worker as a standard and secure model to enable organizations to show cost savings of the digital worker (e.g., no employee benefits, no cost to company (CTC) from payroll perspective, and/or no labor issues) as compared to that of a human employee (e.g., regular worker or contingent worker). Further, the digital worker may enable RPA to follow security norms and ensure authentication, approvals and authorizations to access business processes and systems.

Digital workers created in the employee directory may provide a direct cost saving for the organization when compared to regular or contingent employee. Usage of digital workers may save salary, rewards and recognition, location, site, and assets allocated to a human employee. For example, the digital workforce may not involve cost to accommodate work space in buildings and cost to provide space and equipment. Digital workers as part of the organization's employee directory may facilitate details on a number of digital workers that are working in the organization to process, for example, millions of transactions through RPA. Examples described herein may enable business/organization to understand the savings accrued by employing the digital workers in place of actual human employees for and in, performing the automated processes.

Further, creating the digital workforce in the employee directory of the organization may equate productivity of the digital workforce versus employee workforce or contingent workforce. The digital workforce may reduce manual errors compared to the employee workforce. Furthermore, the digital workforce may inform executives of what amount of work is being done by one single digital workforce as compared to a full time digital employee. Also, the digital workforce may provide seamless processing of RPA tasks and can be implemented over multiple systems, thereby providing 24×7 working hours. Creation of the digital workforce as a part of employee directory may also enable to track the number of digital workers per region and to track RPA processes utilized by the organization across the world.

Referring to FIG. 1, which illustrates a block diagram 100 of an example server 102 for creating a digital worker in an organization. The digital worker may be a part of the digital workforce of the organization to perform/run at least one task (e.g., automated task) that is automated through RPA. The digital worker may refer to an automated tool to perform at least one automated task through at least one robot. The task may include, but not limited to, work related to business processes, information technology (IT) support processes, workflow processes, remote infrastructure, back-office work and the like.

Example automated task may include an RPA task. The digital workforce (i.e., digital workers) may be used to perform the automated task using RPA techniques based on pre-defined rule-based RPA processes. RPA may be used by businesses to automate repetitive and manual tasks that are performed daily by end users.

Figure 2:
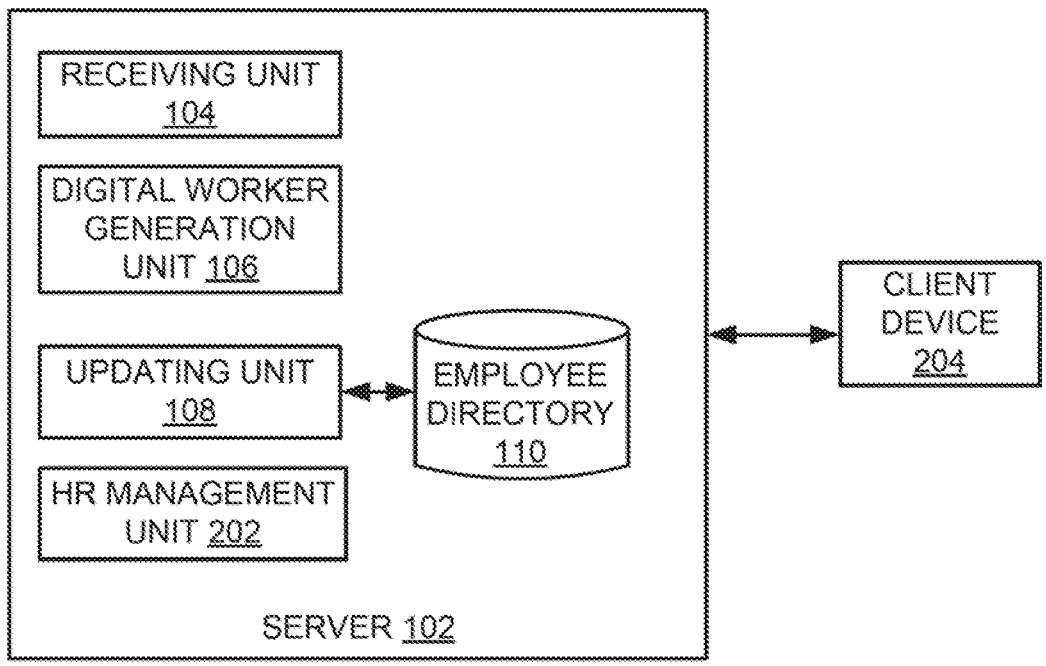
FIG. 2 is a block diagram of the example server including additional components.

As shown in FIG. 1, server 102 may include a receiving unit 104, a digital worker generation unit 106, an updating unit 108 and an employee directory 110. During operation, receiving unit 102 may receive a request to create a digital worker as a part of digital workforce to perform at least one RPA task. For example, the RPA task may refer to a task that is automated through RPA. In one example, the request may be received via a staffing tool of the organization. Staffing tool may be utilized in the process of hiring, positioning and overseeing employees in the organization. Further, the request may be received from a client device based on requirement for the digital worker. FIG. 2 illustrates server 102 communicatively connected to a client device 204. In one example, a user of client device 204 may identify a potential RPA task and then send a request for a digital worker to perform the potential RPA task. Example client device may include, but not limited to, a cellular phone, a laptop, a desktop, a minicomputer, a mainframe computer, workstation, a smartphone, a personal digital assistant (PDA), an Internet of Things (IoT) device and other devices capable of triggering the request to create the digital worker.

Further during operation, digital worker generation unit 106 may create the digital worker in an organization upon receiving the request. In one example, HR management unit 202 (e.g., as shown in FIG. 2) may authorize creation of the digital worker using a HR process upon receiving the request from client device 204. Further, digital worker generation unit 106 may create the digital worker in the organization upon authorizing the creation of the digital worker by HR management unit 202. In one example, digital worker generation unit 106 may create the digital worker with an associated digital worker ID/robotic ID. For example, the HR management unit 202 may perform HR processes including, but not limited to, recruitment and staffing, maintaining and periodically updating a record of resources (e.g., human employees and digital workers), compensation and benefits, providing a business strategy that drives profitability and revenue targets, periodically developing a set of rules and guidelines for obtaining resource supplies, assigning the resources to tasks based on availability of tasks and different skills of each resource and the like through various staffing tools.

Further, digital worker generation unit 106 may generate credentials needed to perform the at least one RPA task for the created digital worker. Example credentials may include at least one of an employee identifier (ID), an email ID, and a network (NT) ID associated with the created digital worker. In one example, the generated credentials may be assigned to the digital worker ID/robotic ID associated with the digital worker. In another example, digital worker generation unit 106 may determine access levels associated with an employee, for example who is earlier assigned, to perform the at least one RPA task and create the digital worker with the determined access levels. The digital worker may have the credentials and access levels needed to perform the at least one RPA task but may not have an associated human employee.

In one example, the digital worker may be used to access the applications which may be predominantly categorized into SAP and non-SAP applications through the credentials and access levels. In other words, the applications may be termed as client-based and web-based applications. The login methodology for the digital worker and the human employee may differ for the applications. Some of the client-based and web-based applications may use the employee ID, email ID, email password, NT ID and NT password to access them. The digital worker once created in the system as the digital workforce may have the email ID, NT ID and employee ID. Thus, the digital worker may be able to perform the automated tasks that the robot is supposed to do using the email ID, NT ID and employee ID, until RPA exists in production for the respective processes.

During operation, updating unit 108 may update the credentials corresponding to the created digital worker in employee directory 110 (e.g., register) of the organization. In one example, employee directory 110 of the organization may be a database including credentials associated with employee workforce and the digital workforce. In one example, credentials associated with employee workforce and the digital workforce may include an employee ID, an email ID, and a NT ID associated with the employees and digital workers of the organization, respectively. The digital worker thus created using the credentials may enable to empower touch less processing. Alternately, credentials of the created digital worker can be updated in a blue book or a new digital register.

In another example, updating unit 108 may update the credentials by replacing credentials of an employee associated with the at least one RPA task (i.e., the employee may be assigned to perform the at least one RPA task) with the generated credentials of the created digital worker in employee directory 110 of the organization. For example, the generated credentials of the created digital worker may be updated in employee directory 110 of the organization in a specified period of time (e.g., hours and/or days). Further, the digital worker may be enabled to perform the at least one RPA task upon updating the credentials associated with the created digital worker in employee directory 110 of the organization. The digital worker may perform the at least one RPA task using RPA techniques based on pre-defined rule-based processes. Even though FIGS. 1 and 2 may be explained using RPA tasks, the digital worker can be used for any type of automation where human intervention may not be required.

When RPA automates preselected process from business, at the time of or before testing automation, a robotic ID may be needed. In one example, the operations may request for a replacement requirement or a digital worker requirement through staffing tool. The approval may flow through HR staffing and through the management chain (e.g., IT and RPA teams) as in case of regular or contractual employees. Upon approval, a digital worker ID associated with the digital worker may get all the credentials of the employee ID, the email ID and/or the NT ID. For example, the created IDs may be get updated in 2-4 working days in the organization's employee directory and then the operations can then use them to execute RPA task. The digital worker part of the organization may have the employee ID and password stored in a password vault and may not accessible to other users or managers. The digital worker IDs and passwords may be sent to RPA team and information may be given to a requestor who requests for the creation of the digital worker. A cyber security approval may be needed to ensure that the risks are covered and mitigated.

The digital worker ID may be under an operations manager, for example with DWxxxx as nomenclature, to report to executives on how much of dollar transactions the digital workers processed over a period of time. Digital workers thus created may be active in the system till the processes exists. When the automated task/process is removed or transformed and/or when the digital worker is not required, the digital worker may be terminated via the staffing tool or through HR staffing process as in the case of regular or contractual employee. Digital workers may be reported to the respective operations managers where the robotic process automation is used.

The digital workforce may be similar to employee workforce/contingent workforce having similar fields and selection criteria that may be needed for employee workforce or contingent workforce. For example, the digital workforce may be created based on the respective operations manager's requirement for a robotic ID for use in RPA. The requirement may be made or submitted through the staffing tool, which may go through regular approval process as is the case with employee workforce or contingent workforce. Once the digital worker is approved, the respective operations manager may have to create a request for generating the email ID, an employee ID and a NT ID in a respective system paving way for these details to be uploaded in an employee register. Once the email ID, the employee ID and the NT ID are uploaded in the employee register, the organization may have the employee workforce, the contingent workforce and the digital workforce. Further, an active directory may be customized to categorize a type of worker (e.g., regular employee, digital worker or contingent employee). For example, payroll may ensure that the worker type for the digital workforce is excluded from salary payments based on the type of the worker and work day may include the digital worker to show the same as under the respective operations manager's workforce or team and all other details (e.g., rewards, recognition, rating and the like) applicable for regular employees or contingent employees may not be applicable for the digital worker. In another example, legal and compliance teams in HR may need to approve the process of creating the digital workforce and may create policies to reflect that the digital workforce is created to run automated processes and may not fall under labor laws that are applicable to humans that are contractual or regular in nature.

In one example, the components of server 102 may be implemented in hardware, machine-readable instructions or a combination thereof. In one example, each of receiving unit 104, digital worker generation unit 106, updating unit 108, and HR management unit 202 may be implemented as engines or modules comprising any combination of hardware and programming to implement the functionalities described herein. Even though FIGS. 1 and 2 describe about server 102, the functionality of the components of server 102 may be implemented in other electronic devices such as personal computers (PCs), server computers, tablet computers, mobile devices and the like.

Server 102 may include computer-readable storage medium comprising (e.g., encoded with) instructions executable by a processor to implement functionalities described herein in relation to FIGS. 1 and 2. In some examples, the functionalities described herein, in relation to instructions to implement functions of receiving unit 104, digital worker generation unit 106, updating unit 108, and HR management unit 202 and any additional instructions described herein in relation to the storage medium, may be implemented as engines or modules comprising any combination of hardware and programming to implement the functionalities of the modules or engines described herein. The functions of receiving unit 104, digital worker generation unit 106, updating unit 108, and HR management unit 202 may also be implemented by the processor. In examples described herein, the processor may include, for example, one processor or multiple processors included in a single device or distributed across multiple devices.

Figure 3A:
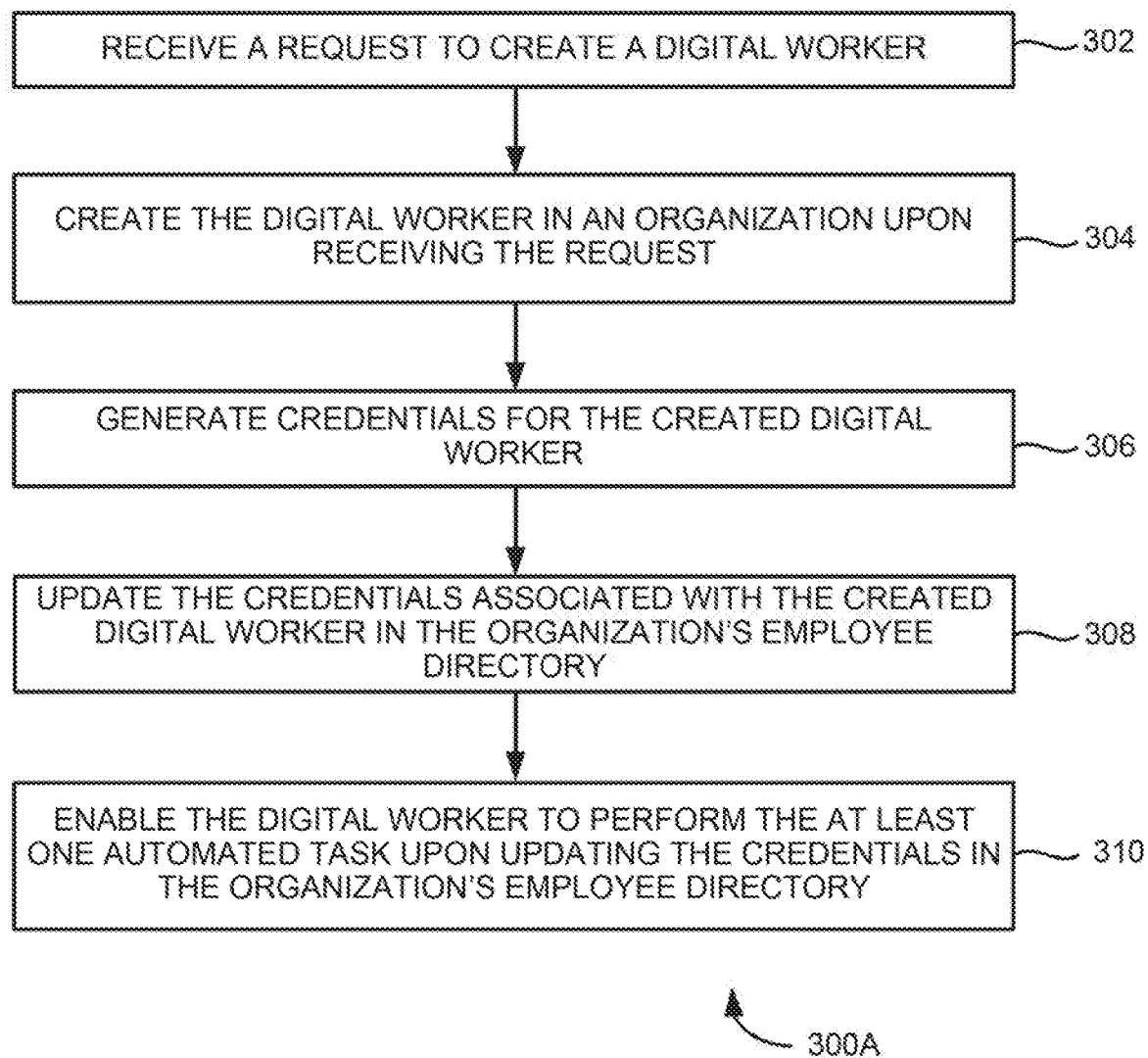
FIG. 3A depicts an example flow chart for creating a digital worker in an organization.

FIG. 3A is an example flow chart 300A of a method for creating a digital worker in an organization. Organization may include employees. Employees may represent the employees of the organization that belong to various departments, such as human resources, engineering, sales, management, and the like. Employees can use a computing device (e.g., client device 204) to access business applications for performing various automated tasks relevant to their role in the company/organization. For example, the automated tasks may include repetitive tasks, which can be automated using RPA techniques. Automated tasks may include transactions or activities that can be performed without human intervention.

It should be understood that the process depicted in FIG. 3A represents generalized illustrations, and that other processes may be added or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 302, a request to create a digital worker may be received. The digital worker may perform at least one automated task. At 304, the digital worker may be created in an organization upon receiving the request. In one example, the digital worker may be a computer program to perform the at least one automated task. In one example, staffing team may receive the request, validate a respective group that raises the request, get approval, and trigger the process of creating the digital worker in the system through staffing tools. At 306, credentials corresponding to the created digital worker may be generated. Example credentials may include an employee identifier (ID), an email ID, and/or a network (NT) ID. For example, the employee ID may enable the digital worker to access applications for performing the at least one automated task. The email ID may enable the digital worker to access web applications. The NT ID may ensure a security of a network and related resources associated with the digital worker.

The credentials may be needed for the digital worker to perform the at least one automated task. At 308, the credentials associated with the created digital worker may be updated in the organization's employee directory. For example, organization's employee directory may include credentials of employees working in the organization and the created digital worker. The credentials may include an employee ID, an email ID, and/or a NT ID associated with the employees and the created digital worker.

In another example, the credentials associated with the created digital worker may be updated in the organization's employee directory by replacing credentials of an employee associated with the at least one automated task with the generated credentials of the created digital worker in the organization's employee directory. The employee assigned to perform the at least one automated task may be replaced by the digital worker and the details associated with the replacement may be updated in company's record (e.g., employee directory). For example, once the created digital worker is ready to perform the automated task, the digital worker may be kept on hold until an actual Employee is released from the blue book or employee register and in exchange the digital worker may be released to replace that actual employee. In another example, the digital worker can be created and released without releasing the actual employee based on authorization from respective business or operations.

In some examples, the credentials associated with the created digital worker may be updated in the organization's employee directory by authenticating creation of the digital worker through a human resource (HR) management process associated with the organization and updating the credentials associated with the created digital worker in the organization's employee directory upon the authentication. Creating the digital worker through the HR management process/staffing tool may provide benefit to the organization as the organization may be able to implement completely touch less processing of automated tasks using the digital worker. For example, controls, security protocols, authentication, audit, and/or restrictions that are applicable to a regular employee or contingent employee may also be applicable to the digital worker. For example, controls may include measures to prevent digital worker being used manually.

At 310, the digital worker may be enabled to perform the at least one automated task upon updating the credentials in the organization's employee directory. In one example, the digital worker may be enabled to perform the at least one automated task based on pre-defined rule-based processes that are automated through RPA upon updating the credentials in the organization's employee directory. In another example, access levels needed to perform the at least one automated task may be generated and the digital worker may be enabled to perform the at least one automated task based on the generated access levels. For example, the credentials and the access levels may be used to apply for robotic access across multiple applications that are automated using RPA. The digital worker may perform the at least one automated task that is automated using RPA techniques.

Further, at least one report may be generated upon performing the at least one automated task by the digital worker. Example report may include transactional information associated with execution of the at least one automated task. Furthermore, the generated report may be sent/reported to an operations manager associated with the digital worker. The at least one report processed by the digital worker may be validated, for instance, by the business or operations.

Figure 3B:
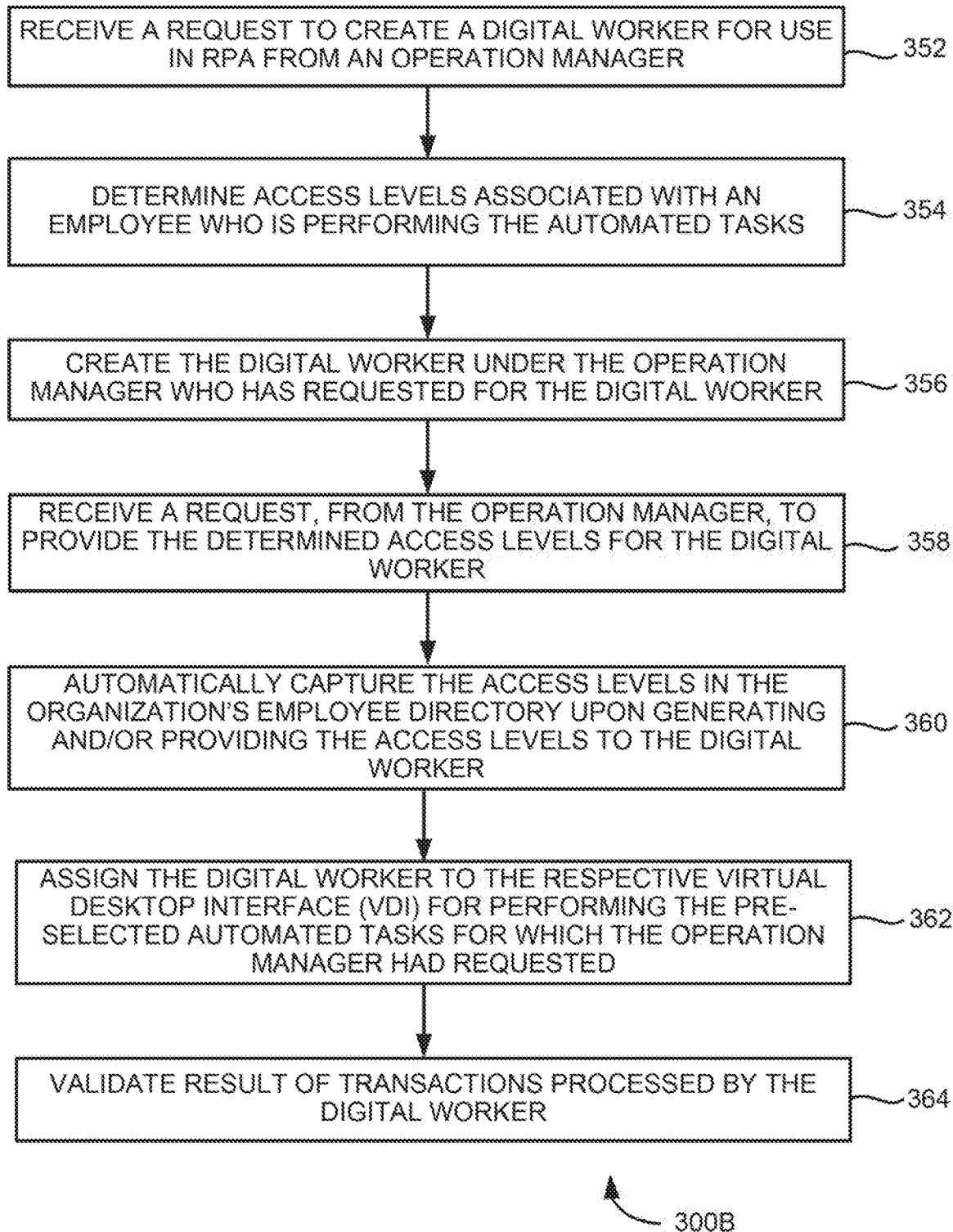
FIG. 3B is another example process 300B for creating a digital worker for use in RPA.

FIG. 3B is an example process 300B for creating a digital worker for use in RPA. At 352, a request may be received to create the digital worker for use in RPA. In one example, the request may be received from an operations manager. At 354, access levels associated with an employee who is performing the automated tasks/processes that are being automated through RPA may be determined. At 356, the digital worker may be created under the operations manager who has requested for the digital worker. At 358, upon creating the digital worker, the operations manager may request to provide the determined access levels (e.g., associated with the employee) for the digital worker to perform the RPA tasks/processes for which the digital worker can be used. In one example, the operations manager may send the request through user access management/HR management/ staffing tools for generating and assigning required access for the digital worker.

At 360, upon generating and/or providing the access levels for the digital worker, the access levels may be automatically captured in the organizations employee directory. At 362, the digital worker may be assigned to the respective virtual desktop interface (VDI) for performing the pre-selected automated tasks/processes for which the operations manager had requested and the digital worker is enabled to perform the pre-selected automated processes/ tasks that a human employee might be performing earlier through robots using the access levels.

At 364, result of transactions processed by the digital worker may be validated, for instance, by business's/operation's management or the operations manager. In one example, the digital worker may be scheduled to perform the required automated tasks on a daily basis as was done by regular employee, thereby completing the digital workforce onboarding process.

The processes 300A and 300B of FIGS. 3A and 3B may show example process and it should be understood that other configurations can be employed to practice the techniques of the present application. For example, processes 300A and 300B may communicate with a plurality of computing devices and the like.

Figure 4:
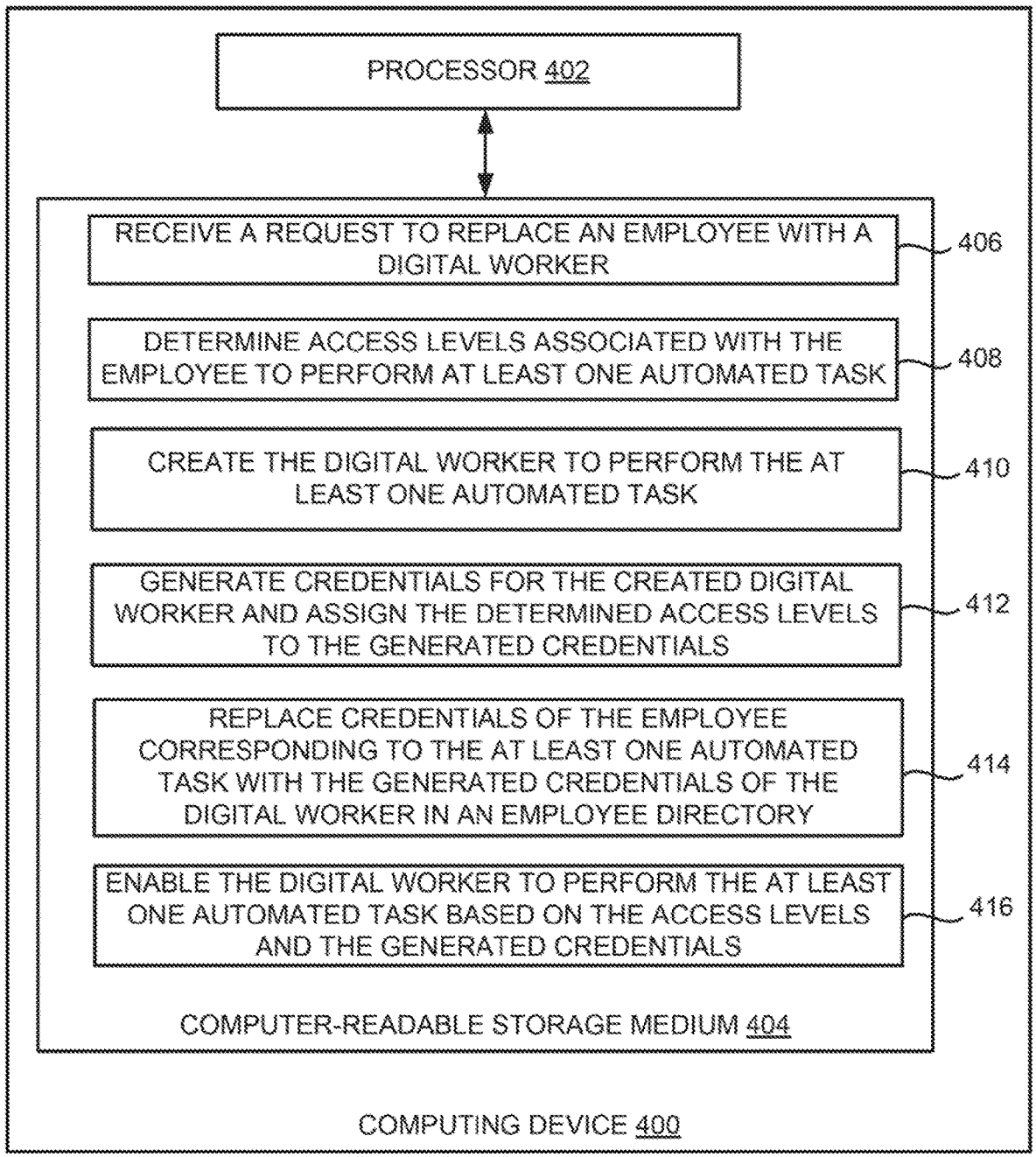
FIG. 4 depicts a block diagram of an example computing device including a non-transitory computer-readable storage medium to replace an employee with a digital worker to perform at least one automated task in an organization.

FIG. 4 illustrates a block diagram of an example computing device 400 including a non-transitory computer-readable storage medium 404 to replace an employee with a digital worker for performing at least one automated task in an organization. Computing device 400 may include processor 402 and computer-readable storage medium 404 communicatively coupled through a system bus. Processor 402 may be any type of central processing unit (CPU), microprocessor, or processing logic that interprets and executes machine-readable instructions stored in computer-readable storage medium 404. Computer-readable storage medium 404 may be a random access memory (RAM) or another type of dynamic storage device that may store information and machine-readable instructions that may be executed by processor 402. For example, computer-readable storage medium 404 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, computer-readable storage medium 404 may be a non-transitory machine-readable medium. In an example, computer-readable storage medium 404 may be remote but accessible to computing device 400.

Computer-readable storage medium 404 may store instructions 406-416. In an example, instructions 406-416 may be executed by processor 402 to provide a mechanism for creating the digital worker for performing the at least one automated task. Instructions 406 may be executed by processor 402 to receive a request to replace an employee with the digital worker to perform the at least one automated task in the organization. The digital worker may be a computer program to perform the at least one automated task. For example, the digital worker may perform the at least one automated task using robotic process automation. Instructions 408 may be executed by processor 402 to determine access levels associated with the employee to perform the at least one automated task.

Instructions 410 may be executed by processor 402 to create the digital worker to perform the at least one automated task upon receiving the request. Instructions 412 may be executed by processor 402 to generate credentials for the created digital worker and the determined access levels may be assigned to the generated credentials of the created digital worker. Instructions 414 may be executed by processor 402 to replace credentials of the employee corresponding to the at least one automated task with the generated credentials of the digital worker in the organization's employee directory. In one example, creation of the digital worker may be authenticated using a human resource (HR) management process associated with the organization and then the credentials of the employee may be replaced with the generated credentials of the digital worker in the organization's employee directory upon successful authentication. Instructions 416 may be executed by processor 402 to enable the digital worker to perform the at least one automated task based on the access levels and the generated credentials.

Examples described above in FIGS. 1-4 may be applicable to RPA tasks, where robots may be used to access applications to perform repetitive tasks needs using an ID. Example use cases for RPA and robotic IDs may include master data creation, order entry, delivery creation, invoice posting in sales and finance systems, report extraction, reconciliation work, and journal entry posting. The digital workforce as an employee in an organization may enable to show how the organization is performing without the actual employee costs and manual errors for performing RPA tasks.

It may be noted that the above-described examples of the present solution are for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

I claim:

1. A server comprising:
a processor; and
a non-transitory storage medium comprising instructions executable by the processor to:
receive a request to replace a human employee with a digital worker to perform a robotic process automation task in an organization, the digital worker comprising an automated tool to perform the robotic process automation task;
in response to receiving the request, authorize creation of the digital worker using a human resources (HR) process by which the regular and contract human employees are recruited and staffed within the organization;
upon authorization, create the digital worker;
generate a worker identifier (ID) for the created digital worker and store the worker ID within an employee directory of the organization that stores regular and contract employee IDs for regular and contract human employees;
transfer credentials of an employee ID within the employee directory that permit the human employee to perform the process automation task to the worker ID within the employee directory; and
cause the digital worker to perform the robotic process automation task using the credentials transferred to the worker ID.

2. The server of claim 1, wherein the digital worker is to perform the robotic process automation task based on predefined rule-based robotic process automation processes.

3. The server of claim 1, wherein the instructions are executable by the processor to further:
validate a report processed by the digital worker, the report comprising transactional information associated with execution of the process automation task; and
report the generated report to an operations manager associated with the digital worker.

4. The server of claim 1, wherein the credentials transferred to the worker ID comprise access levels needed to perform the process automation task.

5. The server of claim 1, wherein the digital worker does not require any human employee ID to perform the robotic process automation task.

6. The server of claim 1, wherein the digital worker is not associated with any human employee.

7. The server of claim 1, wherein the digital worker is created through the HR process.

8. A method comprising:
receiving, by a processor, a request to replace a human employee with a digital worker to perform an automated task in an organization, the digital worker comprising a computer program to perform the automated task;
in response to receiving the request, authorizing, by the processor, creation of the digital work using a human resources (HR) process by which the regular and contract human employees are recruit and staffed within the organization;
upon authorization, creating, by the processor, the digital worker;
generating, by the processor, a worker identifier (ID) for the created digital worker and storing the worker ID within an employee directory of the organization that stores regular and contract employee IDs for regular and contract human employees;
transferring, by the processor, credentials of an employee ID within the employee directory that permit the human employee to perform the process automation task to the worker ID within the employee directory; and
causing, by the processor, the digital worker to perform the automated task using the credentials transferred to the worker ID.

9. The method of claim 8, wherein
the digital worker performs the automated task based on pre-defined rule-based processes.

10. The method of claim 8, further comprising:
validating, by the processor, a report processed by the digital worker, the report comprising transactional information associated with execution of the automated task; and
reporting, by the processor, the generated report to an operations manager associated with the digital worker.

11. The method of claim 8, wherein the credentials transferred to the worker ID comprise access levels needed to perform the automated task.

12. The method of claim 8, wherein the credentials transferred to the worker ID comprise access levels needed to perform the process automation task.

13. The method of claim 8, wherein the digital worker does not require any human employee ID to perform the robotic process automation task, and is not associated with any human employee.

14. The method of claim 8, wherein the digital worker is created through the HR process.

15. A non-transitory machine-readable storage medium comprising instructions executable by a processor to:
receive a request to replace a human employee with a digital worker to perform an automated task in an organization, the digital worker comprising a computer program to perform the automated task;
in response to receiving the request, authorize creation of the digital worker using a human resources (HR) process by which the regular and contract human employees are recruited and staffed within the organization;
upon authorization, create the digital worker;
generate a worker identifier (ID) for the created digital worker and store the worker ID within an employee directory of the organization that stores regular and contract employee IDs for regular and contract human employees;
transfer credentials of an employee ID within the employee directory that permit the human employee to perform the process automation task to the worker ID within the employee directory; and
cause the digital worker to perform the automated task using the credentials transferred to the worker ID.

16. The non-transitory machine-readable storage medium of claim 15, wherein the digital worker performs the automated task based on pre-defined rule-based processes.

17. The non-transitory machine-readable storage medium of claim 15, wherein the wherein the instructions are executable by the processor to further:
validate a report processed by the digital worker, the report comprising transactional information associated with execution of the automated task; and
report the generated report to an operations manager associated with the digital worker.

18. The non-transitory machine-readable storage medium of claim 15, wherein the credentials transferred to the worker ID comprise access levels needed to perform the process automation task.

19. The non-transitory machine-readable storage medium of claim 15, wherein the digital worker does not require any human employee ID to perform the robotic process automation task, and is not associated with any human employee.

20. The non-transitory machine-readable storage medium of claim 15, wherein the digital worker is created through the HR process.

* * * * *